(12) United States Patent
Ogawa

(10) Patent No.: US 11,913,414 B2
(45) Date of Patent: Feb. 27, 2024

(54) CAM, FUEL INJECTION PUMP, AND ENGINE

(71) Applicant: MITSUBISHI HEAVY INDUSTRIES ENGINE & TURBOCHARGER, LTD., Sagamihara (JP)

(72) Inventor: Hisao Ogawa, Kanagawa (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 0 days.

(21) Appl. No.: 17/793,808

(22) PCT Filed: Feb. 19, 2021

(86) PCT No.: PCT/JP2021/006412
§ 371 (c)(1),
(2) Date: Jul. 19, 2022

(87) PCT Pub. No.: WO2021/167078
PCT Pub. Date: Aug. 26, 2021

(65) Prior Publication Data
US 2023/0068282 A1 Mar. 2, 2023

(30) Foreign Application Priority Data
Feb. 21, 2020 (JP) .................. 2020-028255

(51) Int. Cl.
*F02M 59/10* (2006.01)
(52) U.S. Cl.
CPC .................. *F02M 59/102* (2013.01)
(58) Field of Classification Search
CPC .................................................. F02M 59/102
(Continued)

(56) References Cited

U.S. PATENT DOCUMENTS 2,591,401 A * 4/1952 Camner ............. F02M 59/00
239/90
5,592,915 A * 1/1997 Ishiwata ............ F02D 41/407
123/496

(Continued)

FOREIGN PATENT DOCUMENTS

CN 1130237 A 9/1996
EP 0 703 361 A2 3/1996
(Continued)

OTHER PUBLICATIONS

International Search Report for International Application No. PCT/JP2021/006412, dated May 11, 2021.
(Continued)

*Primary Examiner* — Logan M Kraft
*Assistant Examiner* — John D Bailey
(74) *Attorney, Agent, or Firm* — Birch, Stewart, Kolasch & Birch, LLP

(57) ABSTRACT

The purpose of the present invention is to increase the pressure of fuel while reducing an increase in the maximum lift amount of a cam and deterioration of a fuel injection ability. This cam for use in a fuel injection pump that increases the pressure of fuel supplied into a fuel supply chamber by an axial movement of a plunger. The cam includes a first cam surface that causes an increase rate of an axial speed of the plunger when the cam rotates at a constant speed, in a pre-stroke period until the plunger increases the pressure of the fuel in the fuel supply chamber, to be a first increase rate, and a second cam surface that causes the increase rate of the axial speed of the plunger when the cam rotates at the constant speed, in a pressure increasing period that is a period from a start of increasing the pressure of the fuel in the fuel supply chamber by the plunger, to be a (Continued)

second increase rate, wherein the first increase rate is set higher than the second increase rate.

19 Claims, 10 Drawing Sheets

(58) Field of Classification Search
USPC .......................................................... 123/508
See application file for complete search history.

(56) References Cited

U.S. PATENT DOCUMENTS

| | | | | |
|---|---|---|---|---|
| 5,647,326 A * | 7/1997 | Kato | ..................... | F02M 59/265 |
| | | | | 123/500 |
| 5,823,168 A * | 10/1998 | Otoh | ..................... | F02M 59/102 |
| | | | | 123/496 |
| 6,349,706 B1 * | 2/2002 | Hsu | ......................... | F02M 39/02 |
| | | | | 123/496 |
| 6,694,952 B1 * | 2/2004 | Yamazaki | ............... | F04B 9/042 |
| | | | | 123/506 |
| 6,763,808 B2 * | 7/2004 | Ryuzaki | ............... | F02M 59/102 |
| | | | | 123/495 |
| 9,074,567 B2 * | 7/2015 | Park | ........................ | F02M 59/26 |
| 11,131,282 B2 * | 9/2021 | Tamai | ..................... | F04B 9/042 |
| 11,401,883 B2 * | 8/2022 | Styron | .................. | F02D 41/406 |
| 2011/0265765 A1 * | 11/2011 | Furuhashi | ........... | F02D 41/3809 |
| | | | | 123/446 |

FOREIGN PATENT DOCUMENTS

| | | | |
|---|---|---|---|
| JP | 4-191420 A | 7/1992 |
| JP | 5-33738 A | 2/1993 |
| JP | 5-272428 A | 10/1993 |
| JP | 5-340321 A | 12/1993 |
| JP | 8-93595 A | 4/1996 |
| JP | 8-100740 A | 4/1996 |
| JP | 2004-316487 A | 11/2004 |
| JP | 2008-215147 A | 9/2008 |
| JP | 2011-108273 A | 6/2011 |

OTHER PUBLICATIONS

Written Opinion of the International Searching Authority for International Application No. PCT/JP2021/006412, dated May 11, 2021, with an English translation.
Extended European Search Report dated Jul. 28, 2023 for Application No. 21757224.7.

* cited by examiner

CAM, FUEL INJECTION PUMP, AND ENGINE

TECHNICAL FIELD

The present invention relates to a cam, a fuel injection pump, and an engine.

BACKGROUND ART

A fuel injection pump for a diesel engine converts a rotational motion of a camshaft into a reciprocating motion by using a plunger. The fuel injection pump increases a pressure of a fuel in a fuel supply chamber and supplies the fuel to an injector by using the reciprocating motion of the plunger, and injects the pressure-increased fuel from the injector into a combustion chamber of the engine. As the fuel injection pump configured in this way, for example, as disclosed in PTL 1, a so-called mechanical fuel injection pump is known which opens a nozzle to inject the fuel by using a difference between a nozzle valve opening force generated by the pressure-increased fuel and a valve closing force generated by a spring on a nozzle back surface.

CITATION LIST

Patent Literature

[PTL 1] Japanese Unexamined Patent Application Publication No. 4-191420

SUMMARY OF INVENTION

Technical Problem

In the mechanical fuel injection pump configured in this way, the pressure of the fuel to be injected needs to be increased to improve engine performance and gas exhausting. In order to increase the pressure of the fuel, it is effective to increase a speed of a plunger. A speed in a pumping process of the plunger can be increased by designing a cam profile. However, there is room for improvement in setting the cam profile to increase a plunger speed. For example, in order to increase the plunger speed, it becomes necessary to set the cam profile to increase a maximum lift amount of a cam. Consequently, in some cases, a size of the pump may increase. In addition, when the cam profile is set to increase the plunger speed while the maximum lift amount of the cam is maintained, an effective injection period of the fuel is shortened, thereby causing a possibility that fuel injection capacity may be degraded.

The present disclosure is made to solve the above-described problems, and an object of the present disclosure is to provide a cam, a fuel injection pump, and an engine which can increase an injection pressure of a fuel while reducing an increase in a maximum lift amount of a cam and degradation in fuel injection capacity.

Solution to Problem

According to the present disclosure, in order to solve the above-described problems and achieve the object, there is provided a cam used for a fuel injection pump that increases a pressure of a fuel supplied into a fuel supply chamber by moving a plunger in an axial direction. The cam includes a first cam surface in which an increase rate of a speed of the plunger in the axial direction when the cam rotates at a constant speed is a first increase rate during a pre-stroke period until the plunger increases the pressure of the fuel in the fuel supply chamber, and a second cam surface in which the increase rate of the speed of the plunger in the axial direction when the cam rotates at the constant speed is a second increase rate during a pressure increasing period which is a period after the plunger starts to increase the pressure of the fuel in the fuel supply chamber. The first increase rate is set to be higher than the second increase rate.

According to the present disclosure, in order to solve the above-described problems and achieve the object, there is provided a fuel injection pump including the cam, a plunger provided on a cam surface of the cam, and moving in the axial direction in response to rotation of the cam, and a fuel supply chamber that accommodates the plunger.

According to the present disclosure, in order to solve the above-described problems and achieve the object, there is provided an engine including the fuel injection pump, an injector to which the fuel is supplied from the fuel injection pump, and a combustion chamber to which the fuel injected from the injector is supplied.

Advantageous Effects of Invention

According to the present invention, it is possible to increase a fuel injection pressure while reducing an increase in a maximum lift amount of the cam and degradation in fuel injection capacity.

DESCRIPTION OF EMBODIMENTS

Hereinafter, a preferred embodiment of the present invention will be described in detail with reference to the accompanying drawings. The present invention is not limited by the embodiment. In a case where there are a plurality of the embodiments, the present invention also includes a configuration adopted by combining the respective embodiments with each other.

(Configuration of Engine)

Figure 1:
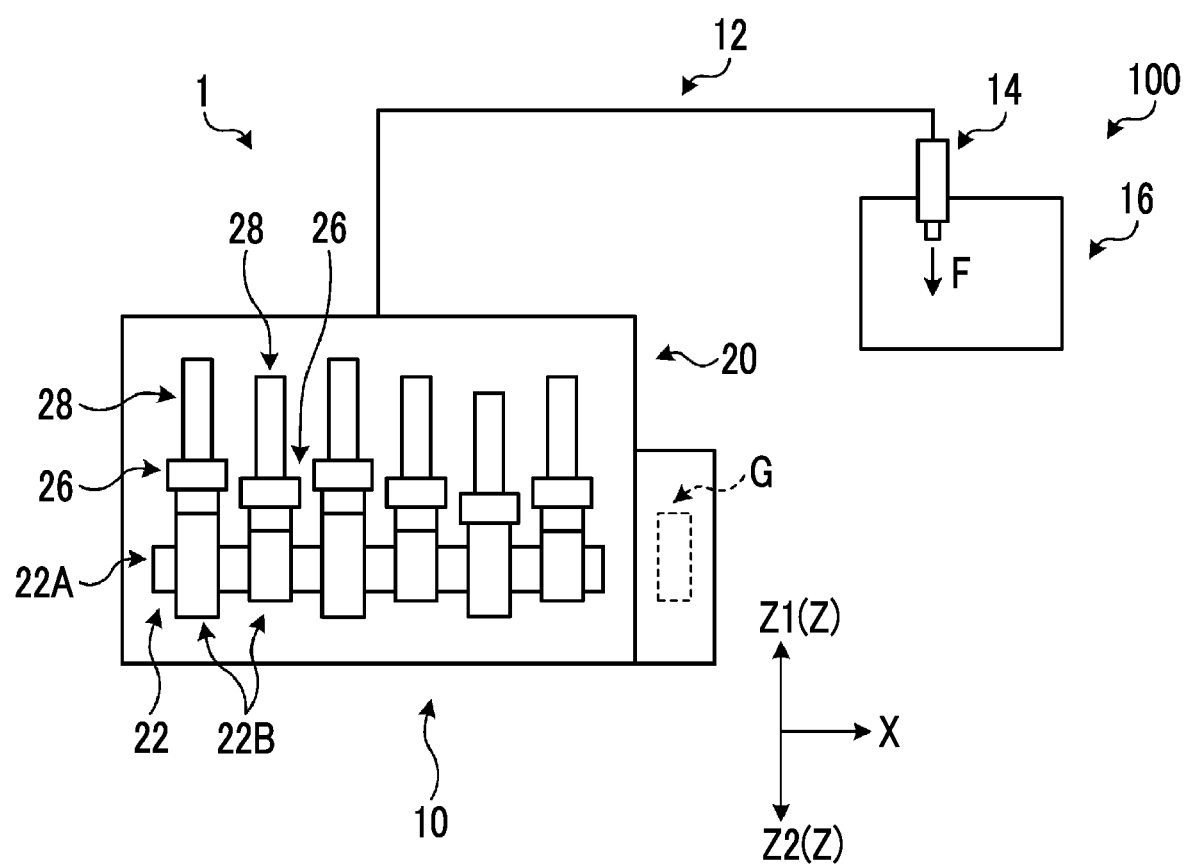
FIG. 1 is a schematic view of an engine according to the present embodiment.

FIG. 1 is a schematic view of an engine according to the present embodiment. As illustrated in FIG. 1, an engine 100 according to the present embodiment includes a fuel injection system 1 and a combustion chamber 16. The engine 100 injects a fuel F into the combustion chamber 16 from the fuel injection system 1. The engine 100 combusts the fuel F in the combustion chamber 16 to operate and drive a drive unit such as a crankshaft (not illustrated). In the present embodiment, the fuel F is light oil, and the engine 100 is a diesel engine. However, the fuel F is not limited to the light oil, and may be any oil. For example, kerosene or heavy oil (heavy oil A). Furthermore, the engine 100 according to the present embodiment is connected to a generator (not illustrated), and drives the generator so that the generator generates power. That is, the engine 100 according to the present embodiment is the engine 100 for power generation facilities. However, an application of the engine 100 is not limited to the power generation facilities, and may be an engine of a ship or a vehicle, for example.

The fuel injection system 1 is a system that injects the high-pressure fuel F into the combustion chamber 16. The fuel injection system 1 includes a fuel injection pump 10, a pipe 12, and an injector 14. In the present embodiment, the fuel injection system 1 is a fuel injection system that does not include a common rail. That is, the fuel injection pump 10 is a so-called mechanical fuel injection pump in which a nozzle of the injector 14 is opened to inject the fuel F by using a difference between a nozzle valve opening force generated by the pressure-increased fuel F of the injector 14 and a spring force on a nozzle back surface.

In the fuel injection pump 10, a cam 22 is provided in a housing 20. The cam 22 includes a shaft 22A serving as a shaft-shaped member extending in an X-direction, and a cam portion 22B provided on an outer periphery of the shaft 22A. In the present embodiment, the cam 22 has a plurality of the cam portions 22B formed in the X-direction. A plunger 28 is provided on the cam portion 22B via a tappet 26. In the present embodiment, the plunger 28 is provided in each of the cam portions 22B via the tappet 26. The plunger 28 is provided in the fuel injection pump 10 to extend in a Z-direction. The Z-direction which is an axial direction of the plunger 28 intersects with the X-direction which is an axial direction of the shaft 22A, and is orthogonal to the X-direction in the present embodiment. Hereinafter, one direction of directions along the Z-direction will be referred to as a Z1-direction, and the other direction, that is, a direction opposite to the Z1-direction will be referred to as a Z2-direction. The Z1-direction is a direction toward a tip side of the plunger 28, that is, a side away from the cam 22. The Z2-direction is a direction toward a base end side of the plunger 28, that is, the cam 22 side. The fuel injection pump 10 may be provided with a governor G for adjusting an injection amount of the fuel F. For example, the governor G adjusts the injection amount of the fuel F by rotating the plunger 28 while the plunger 28 uses the Z-direction as a rotation center.

In this way, the fuel injection pump 10 is a so-called row-type fuel injection pump in which a plurality of the plungers 28 are aligned in the X-direction. In an example in FIG. 1, six cam portions 22B and six plungers 28 are respectively provided in the X-direction. However, the number of the cam portions 22B and the plungers 28 is not limited thereto, and may be determined in any way. In addition, the fuel injection pump 10 is not limited to the row-type fuel injection pump, and may have a structure in which the plurality of plungers 28 are provided on one cam portion 22B, for example.

The pipe 12 is a pipe that connects the fuel injection pump 10 and the injector 14. The pipe 12 connects a fuel supply chamber 34 of the fuel injection pump 10 (to be described later) and a fuel supply chamber 60A of the injector 14. The fuel F in the fuel supply chamber 34 is supplied to the fuel supply chamber 60A of the injector 14 through the pipe 12. The injector 14 is connected to the combustion chamber 16. The injector 14 supplies the fuel F supplied from the fuel injection pump 10 into the combustion chamber 16. In the example in FIG. 1, for convenience of description, one pipe 12 and one injector 14 are provided for one fuel injection pump 10, but may be provided for each of the plungers 28.

(Configuration of Fuel Injection Pump)

Figure 2:
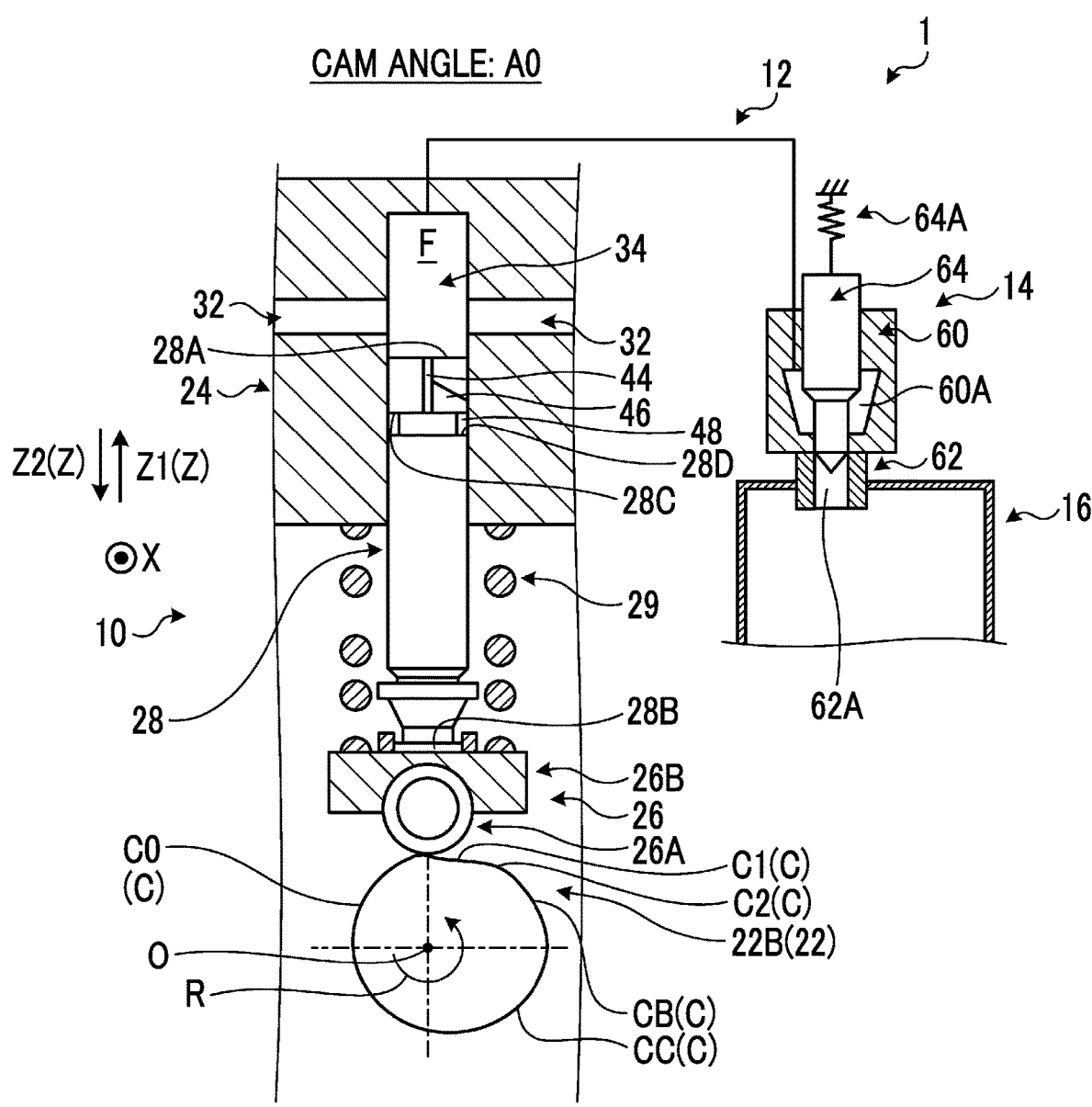
FIG. 2 is a schematic view of a fuel injection system according to the present embodiment.

FIG. 2 is a schematic view of the fuel injection system according to the present embodiment. FIG. 2 includes a schematic sectional view of the fuel injection pump 10 when viewed in the X-direction and a schematic sectional view of the injector 14. As illustrated in FIG. 2, the fuel injection pump 10 includes the cam 22, a barrel 24, the tappet 26, the plunger 28, and a spring portion 29.

The cam 22 rotates in an R-direction while the X-direction is used as the rotation center. That is, the R-direction serving as a rotation direction of the cam 22 is a circumferential direction when the X-direction is a rotation axis, and the direction is set in advance. In an example in FIG. 2, the R-direction is counterclockwise, but the R-direction is not limited thereto. A cam surface C0, a first cam surface C1, a second cam surface C2, a cam surface CB, and a cam surface CC are formed on a surface of the cam portion 22B of the cam 22. The cam surface C0, the first cam surface C1, the second cam surface C2, the cam surface CB, and the cam surface CC are continuously provided in this order in the R-direction. Hereinafter, when the cam surface C0, the first cam surface C1, the second cam surface C2, the cam surface CB, and the cam surface CC are not distinguished, all of these will be referred to as a cam surface C. That is, the cam surface C indicates the surface of the cam portion 22B. Detailed description of the cam surface C will be described later.

The barrel 24 is a member provided on a side in the Z1-direction of the cam 22. The barrel 24 internally has a fuel supply path 32 and the fuel supply chamber 34. For example, the fuel supply path 32 is a flow path connected to a fuel tank of the engine 100, and to which the fuel F stored in the tank is supplied. The fuel supply chamber 34 is a space formed to extend along the Z-direction, and is open on a side in the Z2-direction. The plunger 28 is accommodated in the fuel supply chamber 34 to be slidable in the Z-direction. The fuel supply chamber 34 is connected to the pipe 12. In addition, the fuel supply chamber 34 is formed to communicate with the fuel supply path 32. The fuel F is supplied into the fuel supply chamber 34 from the fuel supply path 32.

The tappet 26 is provided on the cam surface C on a side in the Z1-direction of the cam portion 22B. The tappet 26 includes a roller 26A and a support portion 26B. The roller 26A is provided on the cam surface C to be capable of rolling with respect to the cam surface C of the cam portion 22B. The support portion 26B is a member provided on a side in the Z1-direction of the roller 26A, and supports the roller 26A to be slidable with respect to the support portion 26B.

The plunger 28 is provided on a side in the Z1-direction of the tappet 26. The plunger 28 is a shaft-shaped member extending from a tip portion 28A which is one end portion to a base end portion 28B which is the other end portion. In the plunger 28, the base end portion 28B is supported on a surface of the support portion 26B of the tappet 26 on a side in the Z1-direction. The tip portion 28A is accommodated in the fuel supply chamber 34 of the barrel 24. An outer peripheral surface is supported to be slidable in the fuel supply chamber 34. The plunger 28 extends from the base end portion 28B to the tip portion 28A in the Z1-direction. The plunger 28 is provided on the cam surface C of the cam portion 22B via the tappet 26.

A first lead 44, a second lead 46, and a third lead 48 are formed as notches on an outer peripheral surface of the plunger 28. Here, a location of the plunger 28 between the tip portion 28A and the base end portion 28B in the Z-direction is defined as a first intermediate portion 28C, and a location of the plunger 28 between the first intermediate portion 28C and the base end portion 28B in the Z-direction is defined as a second intermediate portion 28D. The first lead 44 is formed on the outer peripheral surface of the plunger 28 along the Z-direction from the tip portion 28A to the first intermediate portion 28C. In addition, the second lead 46 is formed on the outer peripheral surface of the plunger 28 from a position between the tip portion 28A and the first intermediate portion 28C in the Z1-direction to the first intermediate portion 28C. The second lead 46 is formed so that a width (length in the circumferential direction of the plunger 28) increases toward the first intermediate portion 28C, that is, toward a side in the Z2-direction. The third lead 48 is formed on the outer peripheral surface of the plunger 28 from the first intermediate portion 28C to the second intermediate portion 28D. The third lead 48 is formed over an entire section of the plunger 28 in the circumferential direction, that is, over one round of the plunger 28 in the circumferential direction. The first lead 44 and the second lead 46 communicate with the third lead 48 in the first intermediate portion 28C. In addition, the first lead 44 and the second lead 46 also communicate with each other. In the plunger 28 according to the present embodiment, the first lead 44, the second lead 46, and the third lead 48 are formed in this way. However, without being limited thereto, leads such as the first lead 44, the second lead 46, and the third lead 48 may not be formed, or leads having any shape may be formed.

(Configuration of Injector)

The injector 14 includes a body 60, an injection unit 62, and a nozzle 64. The body 60 is a member in which the fuel supply chamber 60A is formed. The pipe 12 is connected to the fuel supply chamber 60A. The injection unit 62 is a member in which an opening 62A is formed. One end portion of the opening 62A communicates with the fuel supply chamber 60A, and the other end portion communicates with the inside of the combustion chamber 16. The nozzle 64 is a nozzle provided in the fuel supply chamber 60A. The nozzle 64 is biased to close the opening 62A by an elastic member 64A.

(Operation of Fuel Injection System)

When the cam 22 rotates in the R-direction, the fuel injection pump 10 moves so that the plunger 28 reciprocates in the Z-direction. That is, due to the rotation of the cam 22 in the R-direction, the plunger 28 relatively moves on the cam surface C with respect to the cam 22 in the R-direction (the cam 22 relatively moves with respect to the plunger 28 in the R-direction). The plunger 28 moves in the Z-direction in accordance with lifting of the cam 22. The fuel injection pump 10 increases the pressure of the fuel F fetched into the fuel supply chamber 34 by moving the plunger 28 in the Z1-direction. The pressure-increased fuel F is supplied into the fuel supply chamber 60A of the injector 14 through the pipe 12. In the fuel supply chamber 60A, the pressure of the fuel F in the fuel supply chamber 60A acts in a direction for opening the nozzle 64. That is, when a load acting on the nozzle 64 which is generated by the fuel F in the fuel supply chamber 60A is higher than a load acting on the nozzle 64 which is generated by the elastic member 64A, the nozzle 64 is opened, and the fuel supply chamber 60A and the opening 62A communicate with each other. In this manner, the fuel F in the fuel supply chamber 60A is injected into the combustion chamber 16 through the opening 62A.

(Configuration of Cam Surface)

Next, a configuration of the cam 22 of the fuel injection pump 10, more specifically, a configuration of the cam surface C will be described. In the fuel injection pump 10, depending on a shape of the cam surface C, that is, depending on a cam profile, a movement amount (lift amount) of the plunger 28 in the Z-direction, a moving speed of the plunger 28 in the Z-direction when the cam 22 rotates at a constant speed, and a change rate of the moving speed of the plunger 28 in the Z-direction when the cam 22 rotates at the constant speed are determined. Hereinafter, the shape of the cam surface C will be described in association with a position of the plunger 28 in the Z-direction.

Figure 3:
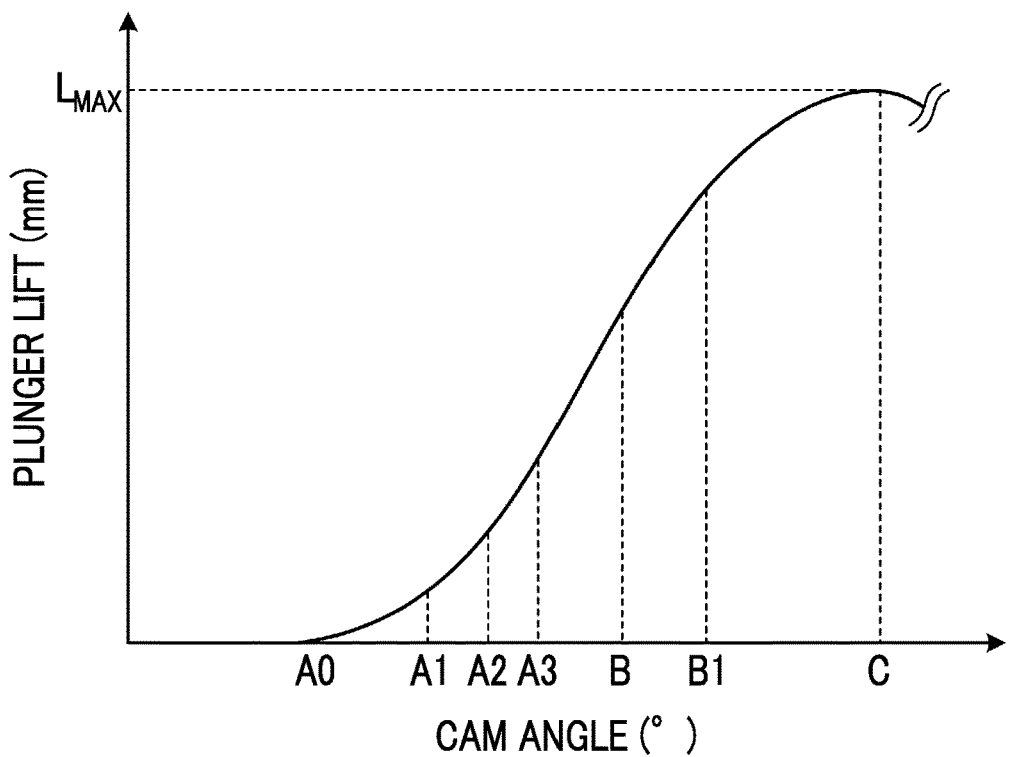
FIG. 3 is a graph illustrating an example of a plunger lift amount at each cam angle.
Figure 4:
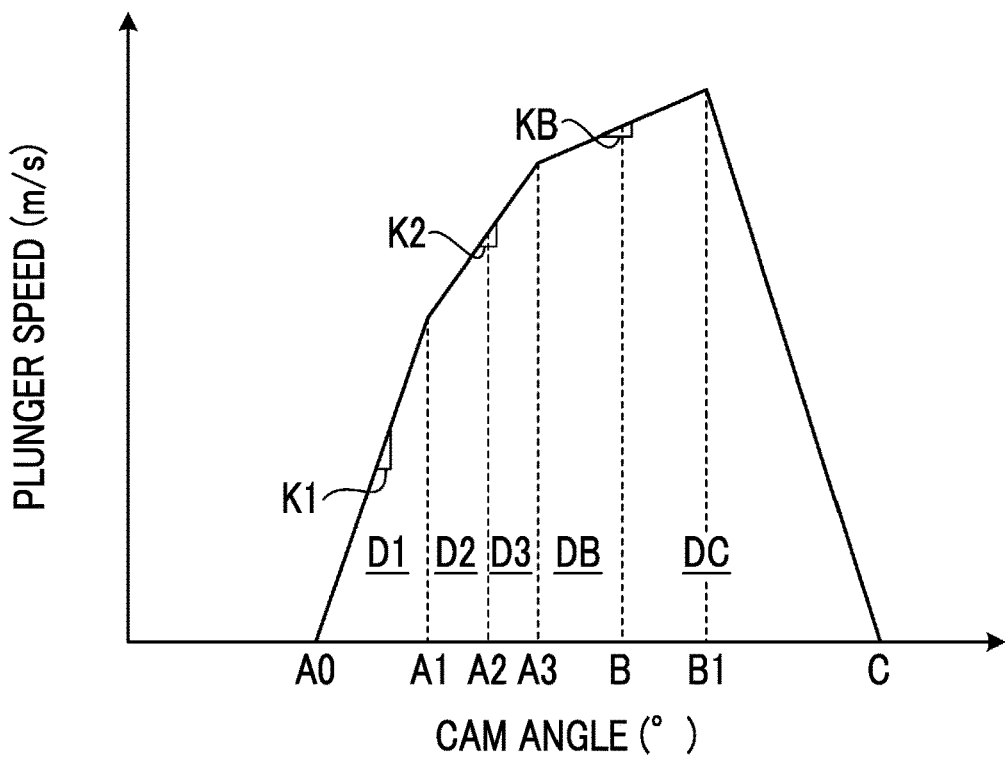
FIG. 4 is a graph illustrating an example of a plunger speed at each cam angle.

FIG. 3 is a graph illustrating an example of a plunger lift amount at each cam angle. FIG. 4 is a graph illustrating an example of a plunger speed at each cam angle. FIGS. 5 to 9 are schematic views illustrating a position of the plunger at each cam angle. A horizontal axis in FIG. 3 indicates a cam angle of the cam 22, and a vertical axis indicates the plunger lift amount, that is, the movement amount of the plunger 28 in the Z-direction at each cam angle. The cam angle indicates a rotation angle when the cam 22 rotates in the R-direction, and has any value from 0° to 360°. FIG. 4 is a time derivative of the graph in FIG. 3. More specifically, the horizontal axis in FIG. 4 indicates the cam angle when the cam 22 rotates at the constant speed. The vertical axis in FIG. 4 indicates the plunger speed at each cam, that is, the speed of the plunger 28 in the Z-direction at each cam angle when it is assumed that the cam 22 rotates at the constant speed. As illustrated in FIGS. 3 and 4, as the cam 22 rotates in the R-direction, the cam angle is continuously changed from a cam angle A0 toward a cam angle C via cam angles A1, A2, A3, B, and B1. In the present embodiment, the first cam surface C1 is a portion of the cam surface C extending from the cam angle A0 to the cam angle A1. The second cam surface C2 is a portion of the cam surface C extending from the cam angle A1 to the cam angle A3. The cam surface CB is a portion of the cam surface C extending from the cam angle A3 to the cam angle C. The cam surface CC is a portion of the cam surface C after the cam angle C.

(Pre-Stroke Period)

The fuel injection pump 10 moves the plunger 28 in the Z1-direction during a pre-stroke period D1, but does not increase the pressure of the fuel F in the fuel supply chamber 34. The pre-stroke period D1 is a period until the pressure of the fuel F in the fuel supply chamber 34 starts to increase. Furthermore, the pre-stroke period D1 indicates a period until the plunger 28 reaches a pressure increasing start position during a period in which the cam 22 rotates. The pressure increasing start position indicates a state where the plunger 28 reaches a position illustrated in FIG. 5, and is a position where the plunger 28 starts to increase the pressure of the fuel F in the fuel supply chamber 34.

FIG. 2 illustrates positions of the cam 22 and the plunger 28 at a time when the pre-stroke period D1 starts. As illustrated in FIG. 2, at the time when the pre-stroke period D1 starts, the tip portion 28A of the plunger 28 is located on a side in the Z2-direction from the fuel supply path 32. Therefore, until the time when the pre-stroke period D1 starts, the fuel supply chamber 34 and the fuel supply path 32 communicate with each other, and the fuel F is supplied into the fuel supply chamber 34. For example, the fuel F is supplied from the fuel supply path 32 to the fuel supply chamber 34 during a period in which the plunger 28 moves in the Z2-direction.

In addition, FIG. 2 illustrates a state where the cam 22 reaches the cam angle A0. That is, the pre-stroke period D1 starts at a time when the cam 22 reaches the cam angle A0. At the time when the cam 22 reaches the cam angle A0, a boundary position between the cam surface C0 and the first cam surface C1 is in a state of being in contact with the roller 26A. In other words, when the cam 22 reaches the cam angle A0, the base end portion 28B of the plunger 28 is in a state of being located on the boundary position between the cam surface C0 and the first cam surface C1. Therefore, the plunger 28 is located on the cam surface C0 during the period until the cam 22 reaches the cam angle A0. As illustrated in FIG. 3, in an example of the present embodiment, the lift amount of the cam 22 when the cam 22 reaches the cam angle A0 is set to 0. The cam surface C0 has a shape so that the lift amount of the plunger 28 is constant (here, the lift amount remains 0) when the cam 22 rotates. In other words, the cam surface C0 has a shape so that a distance from a rotation center O to each position along the R-direction on the cam surface C0 is constant. Therefore, during a period in which the plunger 28 is located on the cam surface C0, that is, until a time when the period is switched to the pre-stroke period D1, the lift amount of the plunger 28 and the speed in the Z-direction are 0 as illustrated in FIGS. 3 and 4. However, the shape of the cam surface C0 is not limited thereto, and may be determined in any way.

Figure 5:
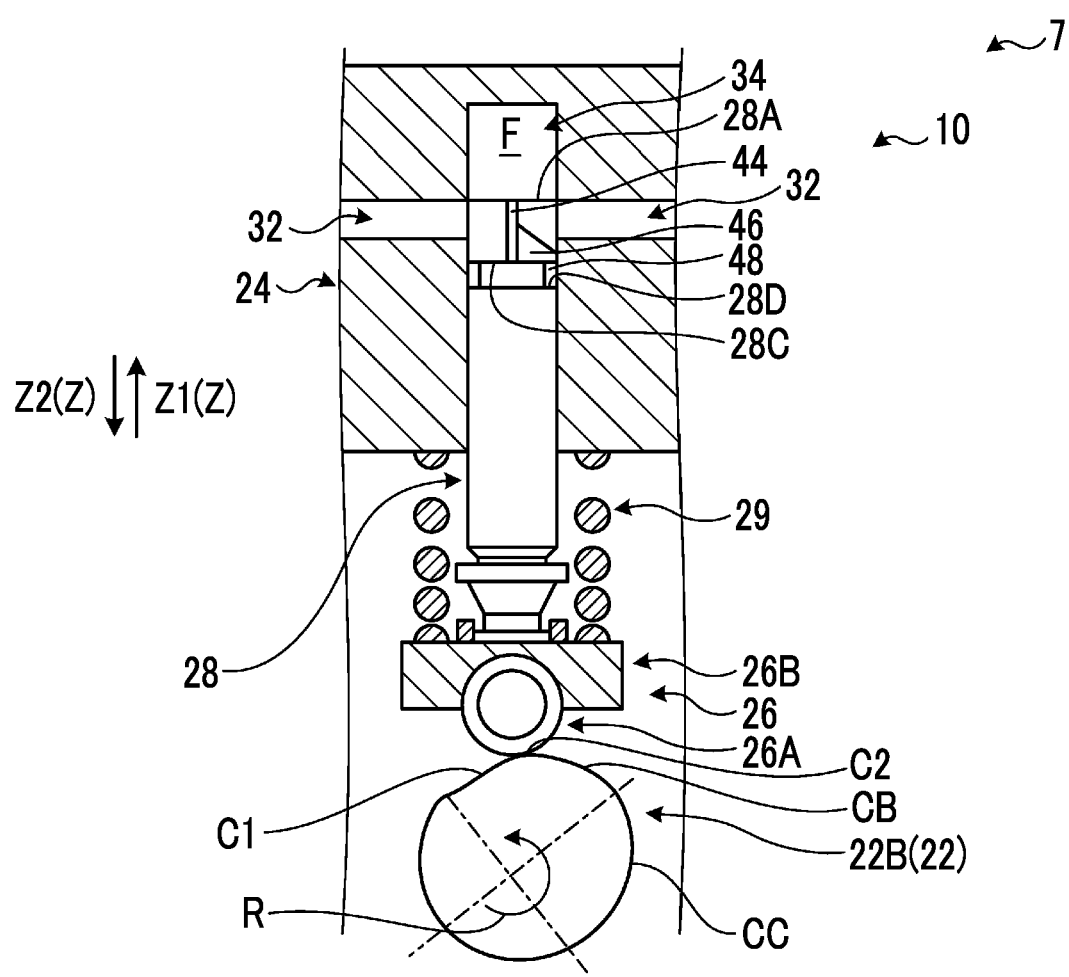
FIG. 5 is a schematic view illustrating a position of a plunger at each cam angle.

FIG. 5 illustrates positions of the cam 22 and the plunger 28 at a time when the plunger 28 reaches the pressure increasing start position. The pressure increasing start position is a position where the plunger 28 starts to increase the pressure of the fuel F in the fuel supply chamber 34, and is a position where the plunger 28 starts to close the fuel supply path 32. Specifically, at the pressure increasing start position, the tip portion 28A of the plunger 28 is located at the same position as the end portion on a side in the Z1-direction of the fuel supply path 32 in the Z-direction, and the plunger 28 closes the fuel supply path 32. The pre-stroke period D1 ends at the time when the plunger 28 reaches the pressure increasing start position. During the pre-stroke period D1, the plunger 28 does not close the fuel supply path 32. Therefore, the fuel supply chamber 34 and the fuel supply path 32 communicate with each other. Therefore, during the pre-stroke period D1, even when the plunger 28 is lifted to move in the Z1-direction, the pressure of the fuel F in the fuel supply chamber 34 is not increased. On the other hand, after the time when the plunger 28 reaches the pressure increasing start position, that is, after the lapse of the pre-stroke period D1, the fuel supply chamber 34 and the fuel supply path 32 are cut off. Therefore, when the plunger 28 is lifted to move in the Z1-direction, the pressure of the fuel F in the fuel supply chamber 34 is increased by compression.

In addition, in a state in FIG. 5, the cam 22 reaches the cam angle A1 illustrated in FIGS. 3 and 4. That is, the cam surface C of the cam 22 is set so that the plunger 28 reaches the pressure increasing start position at a time when the cam angle is the cam angle A1. Therefore, in the present embodiment, a period from the cam angle A0 to the cam angle A1 is the pre-stroke period D1. As illustrated in FIG. 5, when the cam 22 reaches the cam angle A1, a boundary position between the first cam surface C1 and the second cam surface C2 is located at a position in contact with the roller 26A. In other words, when the cam 22 reaches the cam angle A1, the base end portion 28B of the plunger 28 is in a state of being located on the boundary position between the first cam surface C1 and the second cam surface C2.

The plunger 28 is located on the first cam surface C1 from the cam angle A0 to the cam angle A1, that is, during the pre-stroke period D1. The first cam surface C1 has a shape so that the lift amount of the plunger 28 increases toward the R-direction when the cam 22 rotates. In other words, the first cam surface C1 has a shape so that a distance from the rotation center O to the first cam surface C1 is lengthened toward the R-direction. Furthermore, the first cam surface C1 has a shape so that the speed of the plunger 28 in the Z1-direction increases toward the R-direction when the cam 22 rotates at a constant speed. Therefore, the lift amount of the plunger 28 and the speed in the Z-direction during the pre-stroke period D1 increase as the cam angle advances, as illustrated in FIGS. 3 and 4.

Here, the increase rate of the speed of the plunger 28 in the Z1-direction when the cam 22 rotates at the constant speed while the plunger 28 is located on the first cam surface C1 will be referred to as a first increase rate K1 (refer to FIG. 4). The first increase rate K1 is an increase rate of the speed of the plunger 28 in the Z1-direction as the cam 22 rotates in the R-direction (with the lapse of time) during the pre-stroke period D1. The first cam surface C1 is set so that the first increase rate K1 is higher than a second increase rate K2 (to be described later) on the second cam surface C2. The first increase rate K1 here indicates an increase rate of the speed of the plunger 28 in the Z1-direction when the cam 22 rotates at the constant speed for a unit time, and the same applies to the following increase rate (second increase rate K2). In addition, the first cam surface C1 has a shape so that the increase rate of the distance from the rotation center O to the first cam surface C1 increases toward the R-direction. The increase rate of the distance from the rotation center O to the first cam surface C1 indicates an increase rate of the distance separated by a unit distance from the predetermined position in the R-direction from the rotation center O to a position of the first cam surface C1, with respect to the distance from the rotation center O to the predetermined position of the first cam surface C1. The same applies to the following increase rate of the distance.

In this way, the first cam surface C1 is a portion of the cam surface C on which the plunger 28 is located during the pre-stroke period D1, and has a shape so that the increase rate of the speed of the plunger in the Z1-direction when the cam 22 rotates at the constant speed is the first increase rate K1. The first cam surface C1 has a recessed curved surface shape recessed toward the rotation center O of the cam 22. However, the first cam surface C1 is not limited to the recessed curved surface shape, and may have any shape such as a protruding curved surface shape protruding from the rotation center.

(Pressure Increasing Period)

The fuel injection pump 10 increases the pressure of the fuel F in the fuel supply chamber 34 while moving the plunger 28 in the Z1-direction during a pressure increasing period D2. The pressure increasing period D2 is a period after the plunger 28 starts to increase the pressure of the fuel F in the fuel supply chamber 34, and is a period until the fuel F starts to be injected from the injector 14 into the combustion chamber 16. Furthermore, the pressure increasing period D2 indicates a period after the plunger 28 reaches the pressure increasing start position during the period in which the cam 22 rotates, and more specifically, indicates a period in which the plunger 28 is located from the pressure increasing start position to an injection position. The injection position indicates a position of the plunger 28 at a time when the injector 14 starts to inject the fuel F into the combustion chamber 16.

Figure 6:
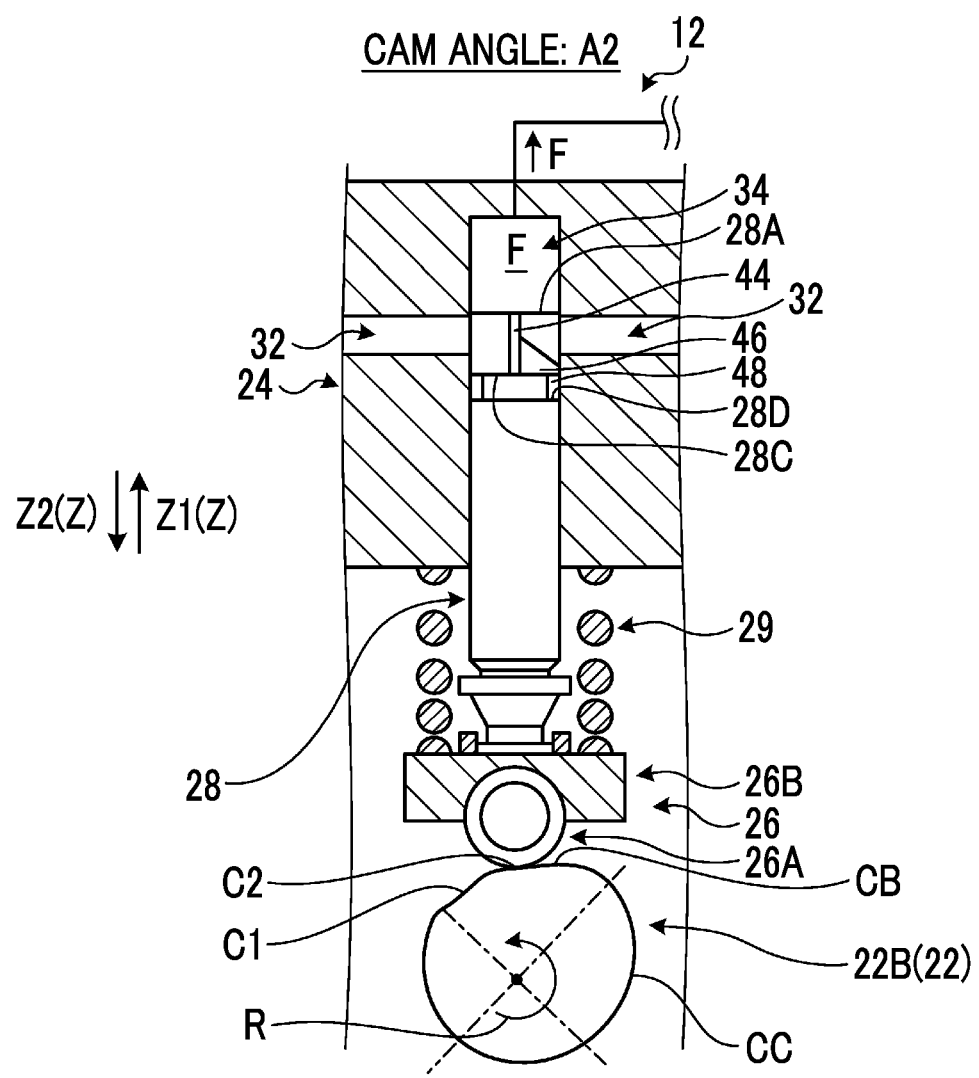
FIG. 6 is a schematic view illustrating a position of the plunger at each cam angle.

As described above, the pressure increasing period D2 is a period after the plunger 28 reaches the pressure increasing start position. Therefore, the pressure increasing period D2 indicates a time when the state in FIG. 5 is switched from the pre-stroke period D1 to the pressure increasing period D2. On the other hand, FIG. 6 illustrates a time when the pressure increasing period D2 ends, in other words, a time when the plunger 28 reaches the injection position. At the injection position, the tip portion 28A of the plunger 28 is located on a side in the Z1-direction from the end portion of the fuel supply path 32 on a side in the Z1-direction. The second lead 46 of the plunger 28 is located on a side in the Z2-direction from the fuel supply path 32, and does not communicate with the fuel supply path 32. Therefore, the plunger 28 continues to close the fuel supply path 32 during the pressure increasing period D2, that is, from the pressure increasing start position to the injection position. Therefore, during the pressure increasing period D2, the fuel F in the fuel supply chamber 34 is compressed, and the pressure is increased as the plunger 28 moves in the Z1-direction. Then, at a time when the plunger 28 reaches the injection position, the nozzle 64 of the injector 14 is opened by the pressure of the fuel F, and the fuel F starts to be injected from the injector 14 into the combustion chamber 16. For example, the injection position of the plunger 28 may be set in accordance with a valve opening pressure of the injector 14 or a position of the fuel supply path 32 in the Z-direction.

In addition, in a state in FIG. 6, that is, in a state where the plunger 28 reaches the injection position, the cam 22 reaches the cam angle A2. That is, in the present embodiment, a period from the cam angle A1 to the cam angle A2 is the pressure increasing period D2. As illustrated in FIG. 6, when the cam 22 reaches the cam angle A2, the cam 22 is located at a position where the second cam surface C2 is in contact with the roller 26A. In other words, when the cam 22 reaches the cam angle A2, the base end portion 28B of the plunger 28 is in a state of being located on the second cam surface C2.

The plunger 28 is located on the second cam surface C2 from the cam angle A1 to the cam angle A2, that is, during the pressure increasing period D2. The second cam surface C2 has a shape so that the lift amount of the plunger 28 increases toward the R-direction when the cam 22 rotates. In other words, the second cam surface C2 has a shape so that a distance from the rotation center O to the second cam surface C2 is lengthened toward the R-direction. Furthermore, the second cam surface C2 has a shape so that the speed of the plunger 28 in the Z1-direction increases toward the R-direction when the cam 22 rotates at the constant speed. Therefore, the lift amount of the plunger 28 and the speed in the Z-direction during the pressure increasing period D2 increase as the cam angle advances, as illustrated in FIGS. 3 and 4.

Here, the increase rate of the speed of the plunger 28 in the Z1-direction when the cam 22 rotates at the constant speed while the plunger 28 is located on the second cam surface C2 will be referred to as the second increase rate K2 (refer to FIG. 4). The second increase rate K2 is the increase rate of the speed of the plunger 28 in the Z1-direction as the cam 22 rotates in the R-direction (with the lapse of time) during the pressure increasing period D2. The second cam surface C2 is set so that the second increase rate K2 is lower than the first increase rate K1 on the first cam surface C1. In addition, the second cam surface C2 has a shape so that the increase rate of the distance from the rotation center O to the second cam surface C2 increases toward the R-direction. Then, the increase rate of the distance from the rotation center O to the second cam surface C2 is lower than the increase rate of the distance from the rotation center O to the first cam surface C1.

In this way, the second cam surface C2 is a portion of the cam surface C on which the plunger 28 is located during the pressure increasing period D2, and has a shape so that the increase rate of the speed of the plunger in the Z1-direction when the cam 22 rotates at the constant speed is the second increase rate K2. The second cam surface C2 has a protruding curved surface shape protruding from the rotation center O of the cam 22. However, the first cam surface C1 is not limited to the protruding curved surface shape, and may have any shape.

In addition, in the present embodiment, the first cam surface C1 and the second cam surface C2 are provided so that the plunger 28 reaches a portion on the boundary position (that is, to reach cam angle A1) between the first cam surface C1 and the second cam surface C2 when the plunger 28 reaches the pressure increasing start position. In other words, the first cam surface C1 and the second cam surface C2 are set so that the first increase rate K1 is switched to the second increase rate K2 when the plunger 28 reaches the pressure increasing start position. However, the time when the plunger 28 reaches the pressure increasing start position and the time when the plunger 28 reaches the portion on the boundary position between the first cam surface C1 and the second cam surface C2 may be different from each other. For example, the time when the plunger 28 reaches the pressure increasing start position may be slightly later or slightly earlier than the time when the plunger 28 reaches the portion on the boundary position between the first cam surface C1 and the second cam surface C2.

(Injection Period)

The fuel injection pump 10 injects the fuel F in the fuel supply chamber 34 from the injector 14 while moving the plunger 28 in the Z1-direction during an injection period D3. The injection period D3 is a period in which the fuel F is injected. Furthermore, the injection period D3 indicates a period after the plunger 28 reaches the injection position during the period in which the cam 22 rotates. In the present embodiment, the injection period D3 is a period in which the plunger 28 is located from the injection position to a post-injection position. The post-injection position indicates a state where the plunger 28 is located at a position illustrated in FIG. 7. As will be described later, the post-injection position indicates a position when the plunger 28 reaches the portion on the boundary position between the second cam surface C2 and the cam surface CB.

Figure 7:
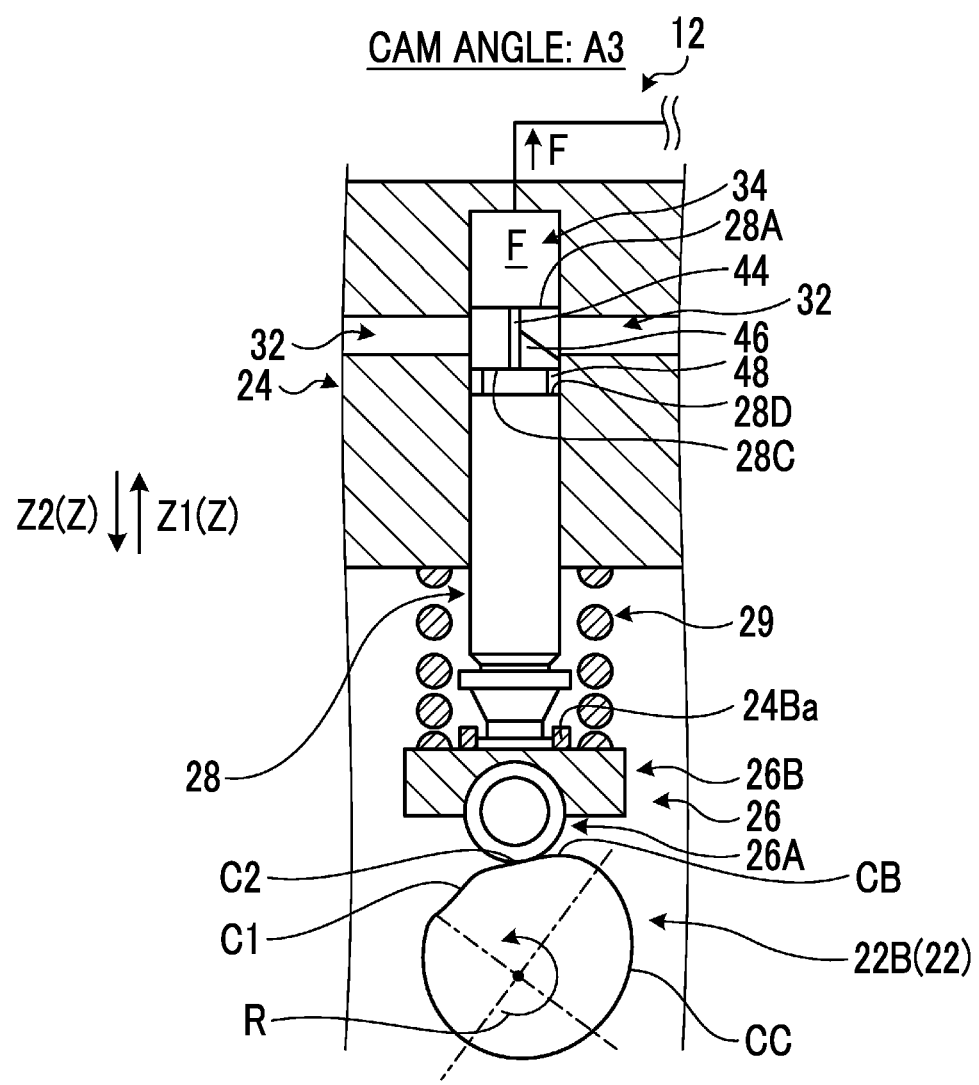
FIG. 7 is a schematic view illustrating a position of the plunger at each cam angle.

The injection period D3 is a period after the plunger 28 reaches the injection position. Therefore, the injection period D3 indicates a time when the state in FIG. 6 illustrating the injection position is switched from the pressure increasing period D2 to the injection period D3. In addition, FIG. 7 illustrates a time when the injection period D3 ends, in other words, a time when the plunger 28 reaches the post-injection position. At the post-injection position, the tip portion 28A of the plunger 28 is located on a side in the Z1-direction from the end portion of the fuel supply path 32 on a side in the Z1-direction, the second lead 46 of the plunger 28 is located on a side in the Z2-direction from the fuel supply path 32, and does not communicate with the fuel supply path 32. The plunger 28 continues to close the fuel supply path 32 while moving in the Z1-direction during the injection period D3, that is, during a period from the injection position to the post-injection position. During the injection period D3, the fuel F is injected from the injector 14 into the combustion chamber 16.

As illustrated in FIG. 7, the cam 22 reaches the cam angle A3 at a time when the plunger 28 reaches the post-injection position. That is, in the present embodiment, a period from the cam angle A2 to the cam angle A3 is the injection period D3. As illustrated in FIG. 7, when the cam 22 reaches the cam angle A3, the boundary position between the second cam surface C2 and the cam surface CB is a position in contact with the roller 26A. In other words, when the cam 22 reaches the cam angle A3, the base end portion 28B of the plunger 28 is in a state of being located on the boundary position between the second cam surface C2 and the cam surface CB.

The plunger 28 is located on the second cam surface C2 during the injection period D3, subsequently to the pressure increasing period D2. Therefore, even during the injection period D3, the plunger 28 moves toward a side in the Z1-direction while the speed is increased at the second increase rate K2, subsequently to the pressure increasing period D2.

(Post-Injection Period)

The fuel injection pump 10 injects the fuel F in the fuel supply chamber 34 from the injector 14 while moving the plunger 28 in the Z1-direction during a post-injection period DB. The post-injection period DB is a period after the plunger 28 reaches the injection position, and is a period in which the fuel F is injected subsequently to the injection period D3. The post-injection period DB is different from the injection period D3 in that the increase rate of the speed of the plunger 28 is switched to an increase rate KB. Furthermore, the post-injection period DB indicates a period after the plunger 28 reaches the post-injection position during a period in which the cam 22 rotates. In the present embodiment, the post-injection period DB is a period in which the plunger 28 is located from the post-injection position to an injection end position. The injection end position indicates a state where the plunger 28 is located at a position illustrated in FIG. 8, and indicates a position of the plunger 28 at a time when the injector 14 ends the injection of the fuel F into the combustion chamber 16.

Figure 8:
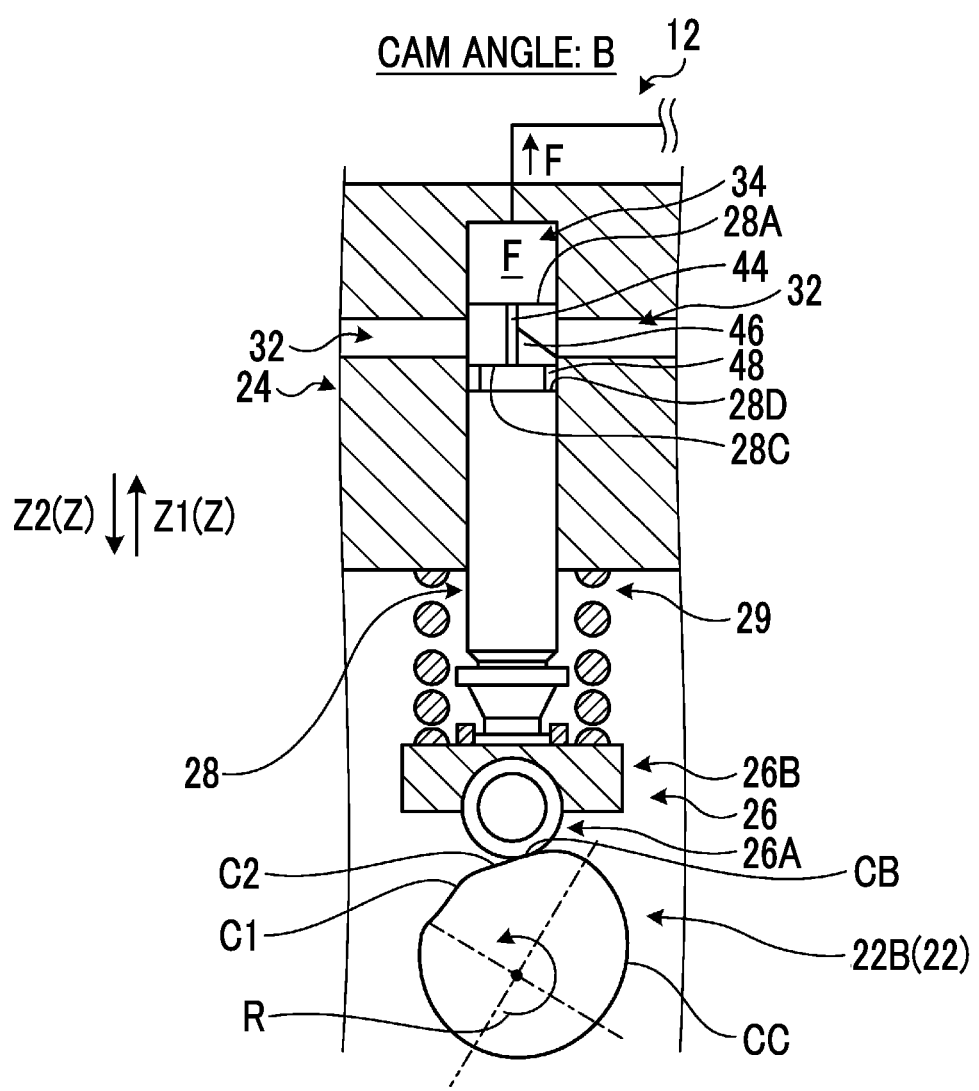
FIG. 8 is a schematic view illustrating a position of the plunger at each cam angle.

As described above, the post-injection period DB is a period after the plunger 28 reaches the post-injection position. Therefore, the post-injection period DB indicates a time when the state in FIG. 7 is switched from the injection period D3 to the post-injection period DB. In addition, FIG. 8 illustrates a time when the post-injection period DB ends. In other words, FIG. 8 illustrates a time when the plunger 28 reaches the injection end position. The injection end position is the position of the plunger 28 where the injection of the fuel F ends, and is a position where the plunger 28 ends closing of the fuel supply path 32. Specifically, at the injection end position, the second lead 46 of the plunger 28 is located at the same position as the fuel supply path 32 in the Z-direction, and the second lead 46 and the fuel supply path 32 communicate with each other. In this manner, the fuel supply chamber 34 communicates with the fuel supply path 32 via the first lead 44 and the second lead 46, and the fuel in the fuel supply chamber 34 can move to the fuel supply path 32 side. Therefore, the pressure of the fuel F in the fuel supply chamber 34 is decreased, the nozzle 64 of the injector 14 is closed, and the injection of the fuel F ends.

In addition, in a state in FIG. 8, that is, in a state where the plunger 28 reaches the injection end position, the cam 22 reaches a cam angle B. That is, in the present embodiment, a period from the cam angle A3 to the cam angle B is the post-injection period DB. As illustrated in FIGS. 7 and 8, from the cam angle A3 to the cam angle B, the cam 22 is located at a position where the cam surface CB is in contact with the roller 26A. In other words, from the cam angle A3 to the cam angle B, the base end portion 28B of the plunger 28 is in a state of being located on the cam surface CB.

The cam surface CB includes a cam surface CB1 which is a portion extending from the cam angle A3 to the cam angle B1 via the cam angle B, and a cam surface CB2 which is a portion extending from the cam angle B1 to the cam angle C. The plunger 28 is located on the cam surface CB1 during the post-injection period DB. The cam surface CB1 has a shape so that the lift amount of the plunger 28 increases toward the R-direction when the cam 22 rotates. In other words, the cam surface CB1 has a shape so that a distance from the rotation center O to the cam surface CB is lengthened toward the R-direction. In addition, the cam surface CB1 has a shape so that the speed of the plunger 28 in the Z1-direction increases toward the R-direction when the cam 22 rotates at the constant speed. Therefore, the lift amount of the plunger 28 and the speed in the Z-direction during the post-injection period DB increase as the cam angle advances, as illustrated in FIGS. 3 and 4.

Here, the increase rate of the speed of the plunger 28 in the Z1-direction when the cam 22 rotates at the constant speed while the plunger 28 is located on the cam surface CB1 will be referred to as an increase rate KB (refer to FIG. 4). The increase rate KB is an increase rate of the speed of the plunger 28 in the Z1-direction as the cam 22 rotates in the R-direction (with the lapse of time) during the post-injection period DB. The cam surface CB1 is set so that the increase rate KB is lower than the first increase rate K1 on the first cam surface C1. Furthermore, the cam surface CB1 is set so that the increase rate KB is lower than the second increase rate K2 on the second cam surface C2. In addition, the cam surface CB1 has a shape so that the increase rate of the distance from the rotation center O to the cam surface CB1 increases toward the R-direction. The increase rate of the distance from the rotation center O to the second cam surface C2 is lower than the increase rate of the distance from the rotation center O to the first cam surface C1. Furthermore, the increase rate of the distance from the rotation center O to the second cam surface C2 is lower than the increase rate of the distance to the second cam surface C2.

In this way, the cam surface CB1 of the cam surface CB is a portion of the cam surface C where the plunger 28 is located during the post-injection period DB, and has a shape so that the increase rate of the speed of the plunger in the Z1-direction when the cam 22 rotates at the constant speed is a third increase rate K3. The cam surface CB has a protruding curved surface shape protruding from the rotation center O of the cam 22. However, the cam surface CB is not limited to the protruding curved surface shape, and may have any shape.

In this way, in the present embodiment, the injection period D3 in a preceding period and the post-injection period DB in a post period are provided as an effective injection period for injecting the fuel F. Then, the increase rate of the speed of the plunger 28 in the post-injection period DB is set to be smaller than the increase rate of the speed of the plunger 28 in the injection period D3. In this manner, it is possible to stabilize an injection amount. However, the fuel injection pump 10 is not limited to a case where the injection period D3 and the post-injection period DB are provided. For example, only the injection period D3 out of the injection period D3 and the post-injection period DB may be provided. In this case, in the cam 22, the second cam surface C2 is formed in the portion of the cam surface CB1. Then, the speed of the plunger 28 increases at the second increase rate K2 over the whole effective injection period, in other words, until the plunger 28 reaches the injection end position.

(Post Period)

The fuel injection pump 10 raises the plunger 28 to a top dead center while reducing the speed of the plunger 28 during a post period DC. The post period DC is a period subsequent to the post-injection period DB, that is, a period after the injection ends. During the post period DC, the pressure of the fuel F is not increased or the fuel F is not injected.

As illustrated in FIG. 4, the post period DC is a period in which the cam 22 reaches the cam angle C from the cam angle B via the cam angle B1. When the cam 22 reaches the cam angle B1, the boundary position between the cam surface CB1 and the cam surface CB2 is a position in contact with the roller 26A (not illustrated). In other words, when the cam 22 reaches the cam angle B1, the base end portion 28B of the plunger 28 is in a state of being located on the boundary position between the cam surface CB1 and the cam surface CB2. Therefore, in the post period DC, during a period in which the cam 22 reaches the cam angle B1 from the cam angle B, the plunger 28 is located on the cam surface CB1, subsequently to the post-injection period DB. Therefore, during the period in which the cam 22 reaches the cam angle B1 from the cam angle B, the plunger 28 moves toward a side in the Z1-direction while increasing the speed at the increase rate KB, subsequently to the post-injection period DB. However, during the period in which the cam 22 reaches the cam angle B1 from the cam angle B, the fuel supply chamber 34 and the fuel supply path 32 communicate with each other via the second lead 46, and the fuel F is not injected.

Figure 9:
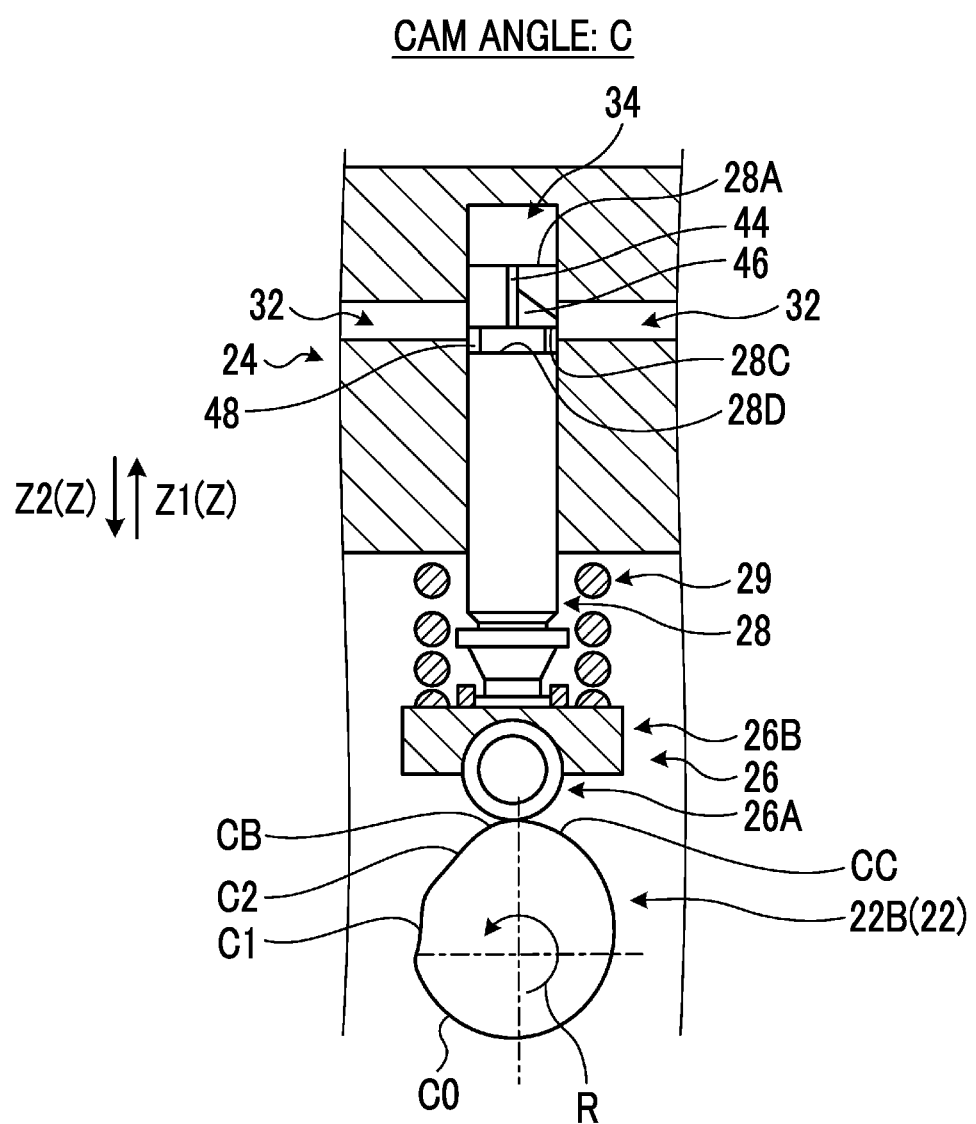
FIG. 9 is a schematic view illustrating a position of the plunger at each cam angle.

FIG. 9 illustrates a case where the cam 22 reaches the cam angle C. As illustrated in FIG. 9, when the cam 22 reaches the cam angle C, the boundary position between the cam surface CB (cam surface CB2) and the cam surface CC is a position in contact with the roller 26A (not illustrated). In other words, when the cam 22 reaches the cam angle C, the base end portion 28B of the plunger 28 is in a state of being located on the boundary position between the cam surface CB2 and the cam surface CC. Therefore, in the post period DC, the plunger 28 is located on the cam surface CB2 during a period in which the cam 22 reaches the cam angle C from the cam angle B1.

The cam surface CB2 has a shape so that the lift amount of the plunger 28 increases toward the R-direction when the cam 22 rotates. In other words, the cam surface CB2 has a shape so that a distance from the rotation center O to the cam surface CB2 is lengthened toward the R-direction. Furthermore, the cam surface CB2 has a shape so that the speed of the plunger 28 in the Z1-direction decreases toward the R-direction when the cam 22 rotates at the constant speed. Therefore, in the post period DC, during a period in which the cam 22 reaches the cam angle C from the cam angle B1, the plunger 28 moves in the Z1-direction while reducing the speed, as illustrated in FIGS. 3 and 4. Then, the plunger 28 reaches the top dead center at the cam angle C, and the lift amount becomes a maximum lift $L_{MAX}$ (refer to FIG. 3). Thereafter, when the rotation of the cam 22 continues, the plunger 28 is located on the cam surface CC, and moves in the Z2-direction in accordance with the shape of the cam surface CC.

As described above, the fuel injection pump 10 switches among the pre-stroke period D1, pressure increasing period D2, the injection period D3, the post-injection period DB, and the post period DC in this order as the cam 22 rotates at the constant speed. During the pre-stroke period D1, the plunger 28 gradually increases the speed in accordance with the first increase rate K1 while rising in the Z1-direction. When the pre-stroke period D1 is switched to the pressure increasing period D2, the plunger 28 continues to ascend in the Z1-direction. While the plunger 28 increases the pressure of the fuel F, the plunger 28 gradually increases the speed in accordance with the second increase rate K2. Then, when the pressure increasing period D2 is switched to the injection period D3, the plunger 28 continues to ascend in the Z1-direction. While the fuel F is injected, the plunger 28 further increases the speed in a state where the second increase rate K2 is maintained. When the injection period D3 is switched to the post-injection period DB, the plunger 28 continues to ascend in the Z1-direction. While the fuel F is injected, the plunger 28 gradually increases the speed in accordance with the increase rate KB. Then, when the post-injection period DB is switched to the post period DC, the injection of the fuel F ends, and the plunger 28 continues to ascend in the Z1-direction. After reaching the maximum lift $L_{MAX}$, the plunger 28 descends in the Z2-direction.

Here, in the fuel injection pump 10, the pressure of the fuel to be supplied needs to be increased to improve engine performance and gas exhausting. In order to increase the pressure of the fuel, it is effective to increase the speed of the plunger. The speed of the plunger can be increased by designing a cam profile. However, for example, in the cam profile configured to increase the plunger speed, the maximum lift amount of the cam may be increased by uniformly increasing the plunger speed. As a result, a size of the pump may be increased in some cases. In addition, when the cam profile is to increase the plunger speed while maintaining the maximum lift amount of the cam, an effective injection period of the fuel may be shortened, thereby causing a possibility that the supply amount of the fuel may decrease. In contrast, in the fuel injection pump 10 according to the present embodiment, the cam profile is set so that the speed increase rate (first increase rate K1) of the plunger 28 during the pre-stroke period D1 before the pressure of the fuel F starts to increase is higher than the speed increase rate (second increase rate K2) of the plunger 28 during the pressure increasing period D2 after the pressure of the fuel F starts to increase. Therefore, according to the fuel injection pump 10 in the present embodiment, the plunger speed is increased during the pre-stroke period D1 before the pressure of the fuel F starts to increase. In this manner, a sufficient plunger speed can be obtained when the fuel F is injected. Therefore, the pressure of the fuel F can be properly increased. In addition, the speed increase rate can be gentle during the pressure increasing period D2. In this manner, while an increase in the maximum lift amount of the cam can be minimized, it is possible to reduce a possibility that the effective injection period may be shortened.

As described above, the cam 22 according to the present embodiment is used for the fuel injection pump 10 that increases the pressure of the fuel F supplied into the fuel supply chamber 34 by moving the plunger 28 in the Z-direction (axial direction). The cam 22 includes the first cam surface C1 and the second cam surface C2. The first cam surface C1 has a shape so that the increase rate of the speed of the plunger 28 in the Z1-direction when the cam 22 rotates at the constant speed during the pre-stroke period D1 until the plunger 28 increases the pressure of the fuel F in the fuel supply chamber 34 is the first increase rate is K1. In addition, the second cam surface C2 has a shape so that the increase rate of the speed the plunger 28 in the Z1-direction when the cam 22 rotates at the constant speed during the pressure increasing period D2 after the plunger 28 starts increasing the pressure of the fuel F in the fuel supply chamber 34 is the second increase rate K2. Then, the first increase rate K1 is set to be higher than the second increase rate K2. In this way, in the cam 22 according to the present embodiment, the cam profile is set so that the first increase rate K1 is higher than the second increase rate K2. Therefore, while the pressure of the fuel F is properly increased by increasing the plunger speed during the pre-stroke period D1, it is possible to reduce an increase in the maximum lift amount of the cam 22 and degradation in fuel injection capacity. The cam 22 according to the present embodiment can reduce an increase in the size or the weight of the fuel injection pump 10 by minimizing an increase in the maximum lift amount of the cam 22.

In addition, the cam 22 according to the present embodiment is provided with the first cam surface C1 and the second cam surface C2 so that the first increase rate K1 is switched to the second increase rate K2 when the plunger 28 reaches the pressure increasing start position where the pressure of the fuel F in the fuel supply chamber 34 starts to increase. The cam 22 according to the present embodiment switches the speed increase rate of the plunger 28 to the second increase rate K2 at a time when the pressure of the fuel F starts to increase. Therefore, while the pressure of the fuel is properly increased, it is possible to reduce an increase in the maximum lift amount of the cam 22 and degradation in the fuel injection capacity.

In addition, the cam 22 according to the present embodiment further includes the cam surface CB1. The cam surface CB1 has a shape so that the increase rate of the speed of the plunger 28 in the Z1-direction when the cam 22 rotates at the constant speed during the post-injection period DB after the plunger 28 reaches the injection position is the increase rate is KB lower than the second increase rate K2. The cam 22 according to the present embodiment can perform stable fuel injection by minimizing the speed increase rate of the plunger 28 during the post-injection period DB.

In addition, the first cam surface C1 has a recessed curved surface shape recessed toward the rotation center O of the cam 22, and the second cam surface C2 has a protruding curved surface shape protruding from the rotation center O of the cam 22. In the cam 22 according to the present embodiment, the first cam surface C1 and the second cam surface C2 have the shape in this way. Accordingly, the cam 22 has a shape so that the first increase rate K1 and the second increase rate K2 can be properly achieved.

In addition, the fuel injection pump 10 according to the present embodiment includes the cam 22, the plunger 28 provided on the cam surface C of the cam 22 and moving in the Z-direction as the cam 22 rotates, and the fuel supply chamber 34 accommodating the plunger 28. Since the fuel injection pump 10 includes the cam 22 as described above, while the pressure of the fuel F is properly increased, it is possible to reduce an increase in the maximum lift amount of the cam 22 and degradation in the fuel injection capacity. The fuel injection pump 10 according to the present embodiment can reduce an increase in the size or the weight of the fuel injection pump 10 by minimizing an increase in the maximum lift amount of the cam 22.

In addition, the fuel injection pump 10 according to the present embodiment is provided with a maximum plunger ascending acceleration section during the pre-stroke period D1 before the pressure of the fuel F starts to increase, that is, ascending acceleration of the plunger 28 is maximized during the pre-stroke period D1 of the all periods. Therefore, it is possible to reduce an increase in the acting pressure and sliding seizure or wear caused by the increased speed when the plunger 28 slides.

In addition, the engine 100 according to the present embodiment includes the fuel injection pump 10, the injector 14 to which the fuel F to be injected from the fuel injection pump 10 is supplied, and the combustion chamber 16 to which the fuel F injected from the injector 14 is supplied. Since the engine 100 according to the present embodiment includes the cam 22 as described above, while the pressure of the fuel F is properly increased, it is possible to reduce an increase in the maximum lift amount of the cam 22 and degradation in the fuel injection capacity. The engine 100 according to the present embodiment can reduce an increase in the size or the weight of the fuel injection pump 10 by minimizing an increase in the maximum lift amount of the cam 22.

(Modification Example)

Next, a modification example will be described. The cam 22 according to the modification example is different from the cam 22 of the above-described embodiment in that the cam 22 according to the modification example includes a third cam surface C3. In the modification example, locations having configurations common to those of the above-described embodiment will be omitted in the description.

Figure 10:
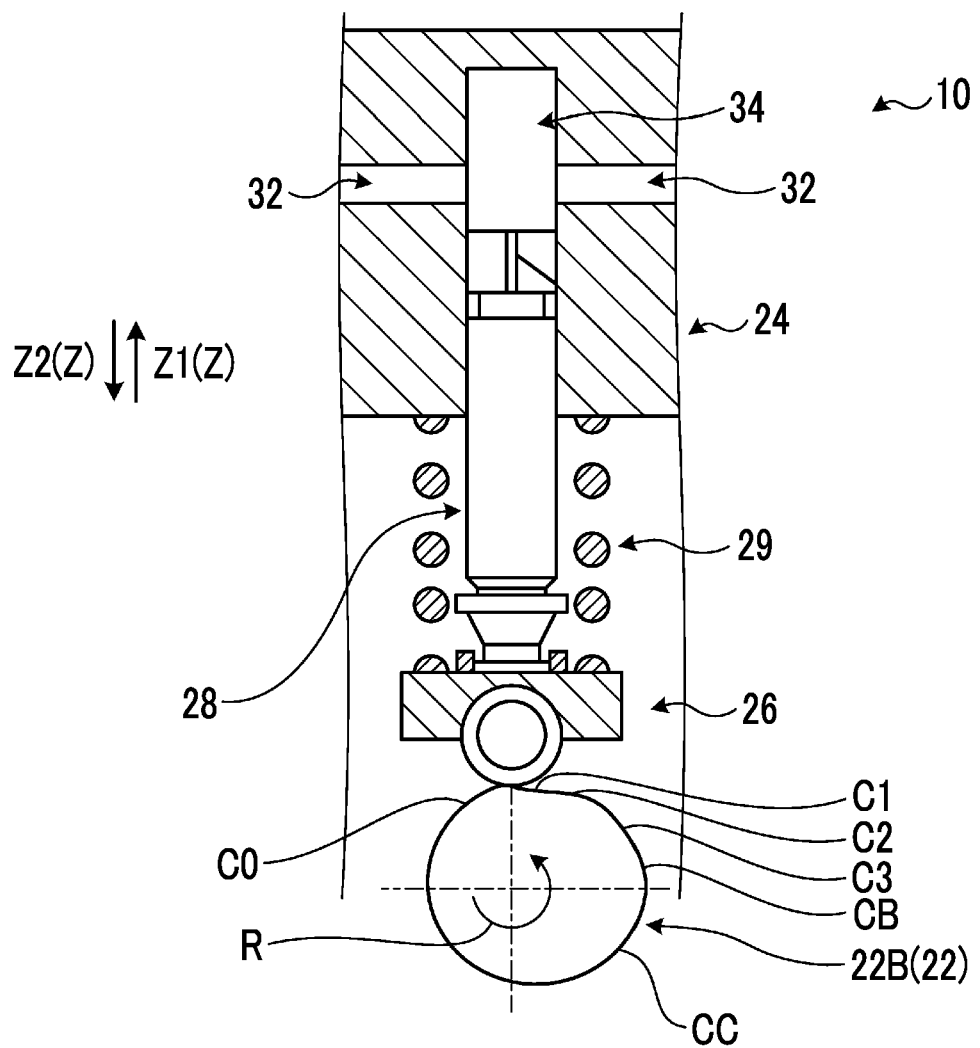
FIG. 10 is a schematic view of a fuel injection pump according to a modification example.
Figure 11:
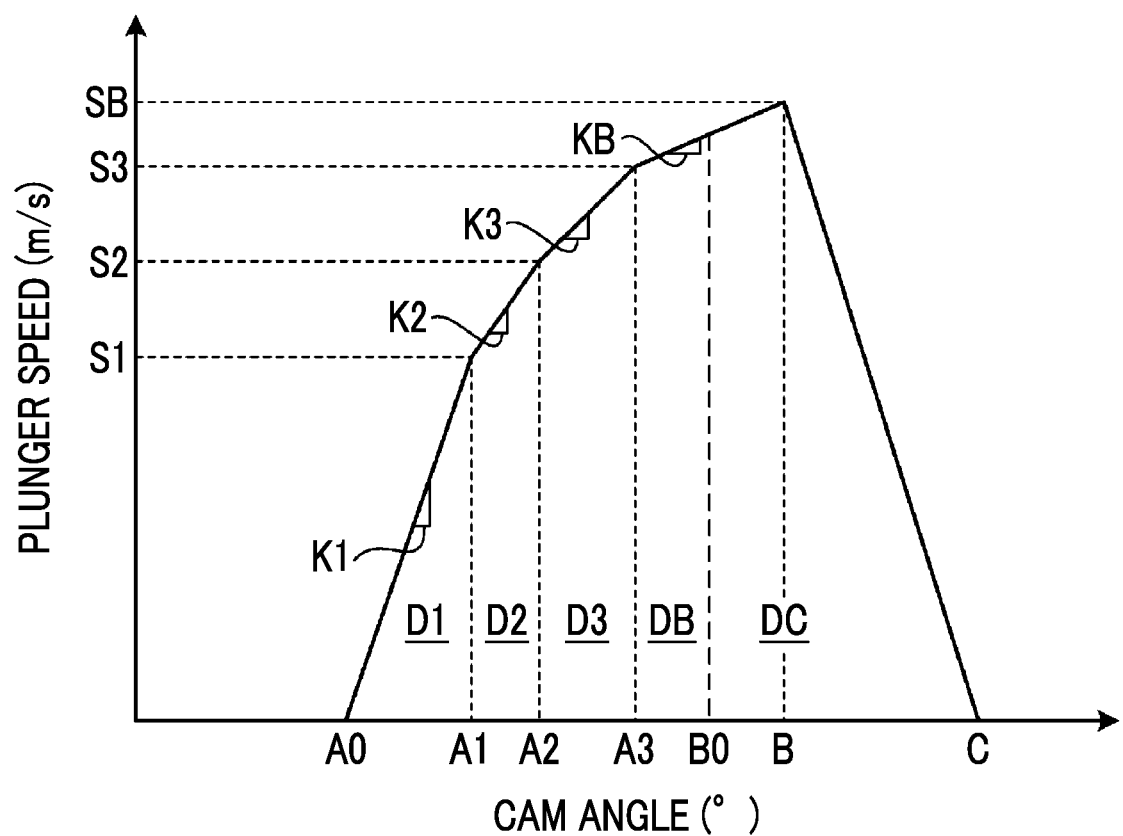
FIG. 11 is a graph illustrating an example of a plunger speed at each cam angle in a modification example.

FIG. 10 is a schematic view of a fuel injection pump according to the modification example, and FIG. 11 is a graph illustrating an example of a plunger speed at each cam angle in the modification example. As illustrated in FIG. 10, in the cam 22 according to the modification example, the cam surface C0, the first cam surface C1, the second cam surface C2, the third cam surface C3, the cam surface CB, and the cam surface CC are formed as the cam surface C. As illustrated in FIG. 11, the second cam surface C2 in the modification example is formed from the cam angle A1 to the cam angle A2 of the cam surface C, and the third cam surface C3 is formed from the cam angle A2 to the cam angle A3 of the cam surface C.

The third cam surface C3 has a shape so that the lift amount of the plunger 28 increases toward the R-direction when the cam 22 rotates. In other words, the third cam surface C3 has a shape so that a distance from the rotation center O to the third cam surface C3 is lengthened toward the R-direction. Furthermore, the third cam surface C3 has a shape so that the speed of the plunger 28 in the Z1-direction increases toward the R-direction when the cam 22 rotates at the constant speed. In addition, the increase rate of the speed of the plunger 28 in the Z1-direction when the cam 22 rotates at the constant speed while the plunger 28 is located on the third cam surface C3 will be referred to as a third increase rate K3. The third increase rate K3 is an increase rate of the speed of the plunger 28 in the Z1-direction as the cam 22 rotates in the R-direction (with the lapse of time) during the injection period D3. The third cam surface C3 is set so that the third increase rate K3 is lower than the first increase rate K1 on the first cam surface C1, more specifically, so that the third increase rate K3 is lower than the second increase rate K2 on the second cam surface C2. In addition, the third cam surface C3 has a shape so that the increase rate of the distance from the rotation center O to the third cam surface C3 increases toward the R-direction. Then, the increase rate of the distance from the rotation center O to the third cam surface C3 is lower than the increase rate of the distance from the rotation center O to the first cam surface C1. Furthermore, the increase rate of the distance from the rotation center O to the third cam surface C3 is lower than the increase rate of the distance from the rotation center O to the second cam surface C2.

In the modification example, the plunger 28 is located on the second cam surface C2 during the pressure increasing period D2 from the cam angle A1 to the cam angle A2. Then, at the cam angle A2 in which the pressure increasing period D2 is switched to the injection period D3, the plunger 28 is located on the boundary position between the second cam surface C2 and the third cam surface C3, and the plunger 28 is located on the third cam surface C3 during the injection period D3 from the cam angle A2 to the cam angle A3. Therefore, in the modification example, during the pressure increasing period D2, the plunger 28 continues to ascend in the Z1-direction. While the plunger 28 increases the pressure of the fuel F, the plunger 28 gradually increases the speed in accordance with the second increase rate K2. Then, when the pressure increasing period D2 is switched to the injection period D3, the plunger 28 continues to ascend in the Z1-direction. While the fuel F is injected, the plunger 28 gradually increases the speed in accordance with the third increase rate K3.

As described above, in the modification example, the cam 22 further includes the third cam surface C3, and the pressure increasing period D2 is a period in which the plunger 28 is located from the pressure increasing start position to the injection position where the fuel F is injected. The third cam surface C3 has a shape so that the increase rate of the speed of the plunger 28 in the Z1-direction when the cam 22 rotates at the constant speed during the injection period D3 after the plunger 28 reaches the injection position is the third increase rate K3. The first increase rate K1 is set to be higher than the third increase rate K3. In the cam 22 according to the modification example, the first increase rate K1 during the pre-stroke period D1 is set to be higher than the third increase rate K3 during the injection period D3. In this manner, the plunger speed can be sufficiently increased until the injection, and the pressure of the fuel F can be properly increased.

In addition, in the modification example, the second increase rate K2 is set to be higher than the third increase rate K3. That is, in the cam 22, the speed increase rate of the plunger 28 is increased in the order of the injection period D3, the pressure increasing period D2, and the pre-stroke period D1. Therefore, according to the cam 22, the plunger speed can be sufficiently increased until the injection period D3, and the pressure of the fuel F can be properly increased. In addition, the speed increase rate during the pressure increasing period D2 is set to be lower than that during the pre-stroke period D1. In this manner, it is possible to reduce a possibility that a load on the plunger 28 may be excessively higher during the pressure increasing period D2 in which the fuel pressure acts on the plunger 28.

Hitherto, the embodiments of the present invention have been described. However, the embodiments are not limited by contents of the embodiments. In addition, the above-described configuration elements include those which can be easily assumed by those skilled in the art, those which are substantially the same, and those which have a so-called equal range. Furthermore, the above-described configuration elements can properly be combined with each other. In addition, various omissions, replacements, or modifications of the configuration elements can be made within the scope not departing from the concept of the above-described embodiments.

REFERENCE SIGNS LIST

1 Fuel injection system
10 Fuel injection pump
12 Pipe
14 Injector
22 Cam
24 Barrel
26 Tappet
28 Plunger
32 Fuel supply path
34 Fuel supply chamber
100 Engine
C1 First cam surface
C2 Second cam surface
D1 Pre-stroke period
D2 Pressure increasing period
D3 Injection period
K1 First increase rate
K2 Second increase rate

The invention claimed is:

1. A cam used for a fuel injection pump that increases a pressure of a fuel supplied into a fuel supply chamber by moving a plunger in an axial direction, the cam comprising:
   a first cam surface in which an increase rate of a speed of the plunger in the axial direction when the cam rotates at a constant speed is a first increase rate during a pre-stroke period until a pressure increasing start position at which the plunger increases the pressure of the fuel in the fuel supply chamber; and
   a second cam surface in which the increase rate of the speed of the plunger in the axial direction when the cam rotates at the constant speed is a second increase rate during a pressure increasing period which is a period after the plunger starts to increase the pressure of the fuel in the fuel supply chamber,
   wherein the first increase rate is set to be higher than the second increase rate, and
   the first increase rate is constant during the pre-stroke period until the pressure increasing start position.

2. The cam according to claim 1,
wherein the first cam surface and the second cam surface are provided so that the first increase rate is switched to the second increase rate at the pressure increasing start position.

3. The cam according to claim 2,
wherein the pressure increasing period is a period in which the plunger is located between the pressure increasing start position and an injection position for injecting the fuel,
the cam further comprises a third cam surface in which the increase rate of the speed of the plunger in the axial direction when the cam rotates at the constant speed is a third increase rate during an injection period after the plunger reaches the injection position, and
the first increase rate is set to be higher than the third increase rate.

4. The cam according to claim 3,
wherein the second increase rate is set to be higher than the third increase rate.

5. A fuel injection pump comprising:
the cam according to claim 1;
a plunger provided on a cam surface of the cam, and moving in the axial direction in response to rotation of the cam; and
a fuel supply chamber that accommodates the plunger.

6. An engine comprising:
the fuel injection pump according to claim 5;
an injector to which the fuel is supplied from the fuel injection pump; and
a combustion chamber to which the fuel injected from the injector is supplied.

7. A fuel injection pump comprising:
the cam according to claim 1;
a plunger provided on a cam surface of the cam, and moving in the axial direction in response to rotation of the cam; and
a fuel supply chamber that accommodates the plunger.

8. The cam according to claim 1, further comprising:
a cam surface in which the increase rate of the speed of the plunger in the axial direction when the cam rotates at the constant speed is an increase rate lower than the second increase rate during a post-injection period after the plunger reaches an injection position for injecting the fuel.

9. The cam according to claim 2, further comprising:
a cam surface in which the increase rate of the speed of the plunger in the axial direction when the cam rotates at the constant speed is an increase rate lower than the second increase rate during a post-injection period after the plunger reaches an injection position for injecting the fuel.

10. The cam according to claim 2,
wherein the first cam surface has a recessed curved surface shape recessed toward a rotation center of the cam, and the second cam surface has a protruding curved surface shape protruding from the rotation center of the cam.

11. A fuel injection pump comprising:
the cam according to claim 2;
a plunger provided on a cam surface of the cam, and moving in the axial direction in response to rotation of the cam; and
a fuel supply chamber that accommodates the plunger.

12. The cam according to claim 3, further comprising:
a cam surface in which the increase rate of the speed of the plunger in the axial direction when the cam rotates at the constant speed is an increase rate lower than the second increase rate during a post-injection period after the plunger reaches an injection position for injecting the fuel.

13. The cam according to claim 3,
wherein the first cam surface has a recessed curved surface shape recessed toward a rotation center of the cam, and the second cam surface has a protruding curved surface shape protruding from the rotation center of the cam.

14. A fuel injection pump comprising:
the cam according to claim 3;
a plunger provided on a cam surface of the cam, and moving in the axial direction in response to rotation of the cam; and
a fuel supply chamber that accommodates the plunger.

15. The cam according to claim 4, further comprising:
a cam surface in which the increase rate of the speed of the plunger in the axial direction when the cam rotates at the constant speed is an increase rate lower than the second increase rate during a post-injection period after the plunger reaches an injection position for injecting the fuel.

16. The cam according to claim 4,
wherein the first cam surface has a recessed curved surface shape recessed toward a rotation center of the cam, and the second cam surface has a protruding curved surface shape protruding from the rotation center of the cam.

17. A fuel injection pump comprising:
the cam according to claim 4;
a plunger provided on a cam surface of the cam, and moving in the axial direction in response to rotation of the cam; and
a fuel supply chamber that accommodates the plunger.

18. The cam according to claim 8,
wherein the first cam surface has a recessed curved surface shape recessed toward a rotation center of the cam, and the second cam surface has a protruding curved surface shape protruding from the rotation center of the cam.

19. A fuel injection pump comprising:
the cam according to claim 8;
a plunger provided on a cam surface of the cam, and moving in the axial direction in response to rotation of the cam; and
a fuel supply chamber that accommodates the plunger.

* * * * *